United States Patent [19]
Chen

[11] Patent Number: 5,889,906
[45] Date of Patent: Mar. 30, 1999

[54] SIGNAL ROUTER WITH COUPLING OF MULTIPLE WAVEGUIDE MODES FOR PROVICING A SHAPED MULTI-CHANNEL RADIATION PATTERN

[75] Inventor: Jerry Chia-yung Chen, Keyport, N.J.

[73] Assignee: Lucent Technologies Inc., Murray Hill, N.J.

[21] Appl. No.: 864,053

[22] Filed: May 28, 1997

[51] Int. Cl.$^6$ .............................. G02B 6/26; H04J 14/00
[52] U.S. Cl. ................................ 385/28; 385/24; 385/27; 385/39; 385/42; 385/46; 359/115; 359/116; 359/124; 359/127
[58] Field of Search .............................. 385/2, 3, 24, 27, 385/28, 31, 39, 46, 42; 359/115, 116, 124, 127

[56] References Cited

U.S. PATENT DOCUMENTS

| | | | |
|---|---|---|---|
| 4,053,764 | 10/1977 | Sierak et al. | 385/28 X |
| 4,786,131 | 11/1988 | Mahapatra et al. | 385/24 X |
| 4,904,042 | 2/1990 | Dragone | 385/24 X |
| 5,002,350 | 3/1991 | Dragone | 385/24 X |
| 5,039,993 | 8/1991 | Dragone | 343/776 |
| 5,136,671 | 8/1992 | Dragone | 385/46 |
| 5,185,828 | 2/1993 | Van Der Tol | 385/28 |
| 5,396,507 | 3/1995 | Kaminow et al. | 372/20 |
| 5,410,625 | 4/1995 | Jenkins et al. | 385/28 |
| 5,412,744 | 5/1995 | Dragone | 385/24 |
| 5,425,116 | 6/1995 | Dragone et al. | 385/24 |
| 5,450,511 | 9/1995 | Dragone | 385/37 |
| 5,467,418 | 11/1995 | Dragone | 385/37 |
| 5,488,680 | 1/1996 | Dragone | 385/24 |
| 5,680,236 | 10/1997 | Van Der Tol | 359/127 |
| 5,745,612 | 4/1998 | Wang et al. | 385/24 |
| 5,745,618 | 4/1998 | Li | 385/46 |
| 5,748,811 | 5/1998 | Amersfoort et al. | 385/15 |
| 5,768,450 | 6/1998 | Bhagavatula | 385/24 |

OTHER PUBLICATIONS

M.G. Young et al., "A 16x1 Wavelength Division Multiplexer with Integrated Distributed Bragg Reflector Lasers and Electroabsorption Modulators", IEEE Photonics Technology Letters, vol. 5, pp. 908–910, Aug. 1993.

C. Dragone, "Efficient NxN Star Couplers Using Fourier Optics", IEEE Journal of Lightwave Technology, vol. 7, No. 3, pp. 479–489, Mar. 1989.

C. Dragone, "Efficiency of a Periodic Array with Nearly Ideal Element Pattern", IEEE Photonics Technology Letters, vol. 1, No. 8, pp. 238–240, Aug. 1989.

C. Dragone, "Optimum Design of a Planar Array of Tapered Waveguides", Journal of the Optical Society of America, vol. 7, No. 11, pp. 2081–2093, Nov. 1990.

C. Dragone, "Optimal Finite–Aperture Filters with Maximum Efficiency", Journal of the Optical Society of America, vol. 9, No. 11, pp. 2048–2054, Nov. 1992.

C. van Dam et al., "Loss Reduction for Phased–Array Demultiplexers Using a Double Etch Technique", Integrated Photonics Research, Boston, MA, pp. 52–55, Apr. 29–May 2, 1996.

(List continued on next page.)

Primary Examiner—Brian Healy

[57] ABSTRACT

A signal router includes a free space region with input and output sides. A number of input and output waveguide arms extend from the respective input and output sides of the free space region. At least a subset of the input or output waveguide arms are configured such that a signal applied to one of the waveguide arms excites multiple modes of that waveguide arm. Coupling between the multiple modes of the various waveguide arms is used to shape a multi-channel output radiation pattern of the router. The excitation of multiple modes may be provided by configuring a given waveguide arm to include a first portion and a second portion, with the second portion arranged between the first portion and a side of the free space region and having a width which is greater than a width of the first portion. Alternatively, the excitation of multiple modes may be provided by including one or more auxiliary waveguide arms between a given pair of main input or output waveguide arms. In either case, a desired multi-channel radiation pattern for a given router may be provided by altering characteristics of the waveguide arms.

25 Claims, 7 Drawing Sheets

OTHER PUBLICATIONS

L.B. Soldano and E.C.M. Pennings, Optical Multi–Mode Interference Devices Based on Self–Imaging: Principles and Applications, IEEE Journal of Lightwave Technology, vol. 13, No. 4, pp. 615–627, Apr 1995.

P.A. Besse et al., "New 2x2 and 1x3 Multimode Interference couplers with Free Selection of Power Splitting Ratios", IEEE Journal of Lightwave Technology, vol. 14, No. 10, pp. 2286–2293, Oct. 1996.

J.B.D. Soole et al., "Use of Multimode Interference Couplers to Broaden the Passband of Wavelength–Dispersive Integrated WDM Filters", IEEE Photonics Technology Letters, vol. 8, No. 10, pp. 1340–1342, Oct. 1996.

SIGNAL ROUTER WITH COUPLING OF MULTIPLE WAVEGUIDE MODES FOR PROVICING A SHAPED MULTI-CHANNEL RADIATION PATTERN

FIELD OF THE INVENTION

The present invention relates generally to star couplers and other signal routers for use in optical, microwave and other signal routing applications, and more particularly to a signal router in which coupling from multiple modes of a given waveguide arm is used to produce a radiation pattern having a desired shape.

BACKGROUND OF THE INVENTION

A star coupler is a signal router commonly utilized in both microwave and optical frequency ranges. In the microwave context, star couplers are used to focus fields emanating from a phased array of antennas into a narrow beam, as described in, for example, N. Amitay et al., "Theory and Analysis of Phased Array Antennas," New York: Wiley, 1972. In the optical context, star couplers are useful in applications such as combining the outputs from laser arrays and multiplexing wavelengths in wavelength grating routers. For example, M. G. Young et al., "A 16×1 Wavelength Division Multiplexer with Integrated Distributed Bragg Reflector Lasers and Electroabsorption Modulators," IEEE Photonics Technology Letters, Vol. 5, pp. 908–10, August 1993, which is incorporated by reference herein, describes the use of star couplers to combine and focus light from an array of lasers. U.S. Pat. No. 5,002,350, which issued Mar. 26, 1991 to C. Dragone and is incorporated by reference herein, describes the use of star couplers to collect light from an array of waveguide arms in a wavelength grating router.

Figure 1:
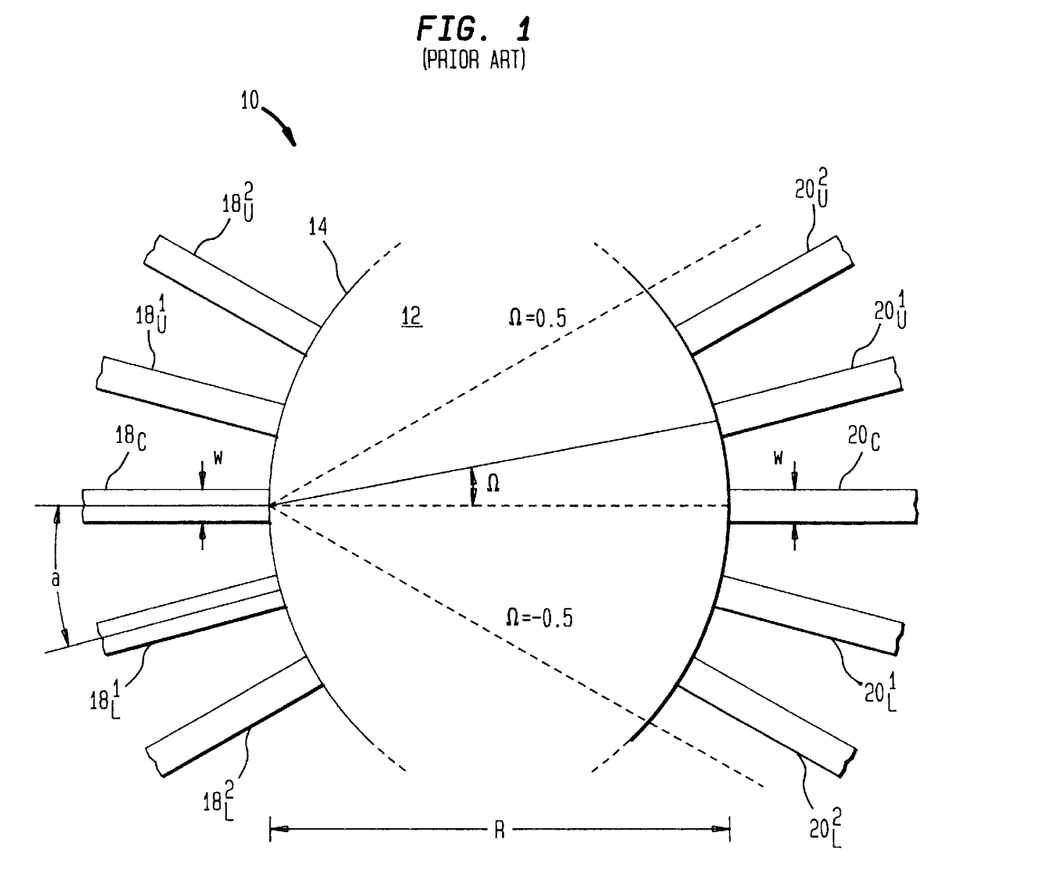
FIG. 1 shows a conventional star coupler.

FIG. 1 shows a conventional optical star coupler 10 of the type described in greater detail in U.S. Pat. No. 4,904,042, which issued Feb. 27, 1990 to C. Dragone and is incorporated by reference herein. The star coupler 10 includes a high-index free space region 12 which is bounded by left and right circular arcs 14 and 16, respectively. The free space region 12 is typically formed as a slab of low-loss dielectric or other material. A number of input waveguide arms $18_C$, $18_L^i$ and $18_U^i$ are aligned in an array along the left arc 14, each pointing to the center of the right arc 16. A number of output waveguide arms $2_C$, $2_L^i$ and $20_U^i$ are aligned in an array along the right arc 16, each pointing to the center of the left arc 14. The input and output waveguide arms 18 and 20 each have a width w. The spacing a between the center lines of adjacent waveguide arms is referred to as the period of the coupler 10. In the conventional coupler 10, there is generally only one period, or unit cell, for each of the input or output waveguides. The radius of curvature R of the star coupler 10 is the distance between the centers of the left arc 14 and the right arc 16. A normalized angle $\Omega$ is defined such that a first Brillouin zone of the star coupler 10 extends from $\Omega=-0.5$ to $\Omega=0.5$ as indicated by the dashed lines in FIG. 1. Ideally, all of the optical signal light radiating from the star coupler 10 should be focused uniformly in the first Brillouin zone, and no stray light should exist outside that zone. In practice, substantial amounts of light fall outside the first Brillouin zone, such that the efficiency of a laser array or wavelength grating router incorporating star coupler 10 is significantly reduced. Moreover, the output radiation pattern in the first Brillouin zone of conventional star coupler 10 is not distributed evenly but is instead peaked in its center.

A number of techniques are known for increasing the efficiency of the conventional star coupler 10. One such technique, described in greater detail in C. Dragone, "Efficient N×N Star Couplers Using Fourier Optics," IEEE Journal of Lightwave Technology, Vol. 7, No. 3, pp. 479–489, March 1989, C. Dragone, "Efficiency of a Periodic Array with Nearly Ideal Element Pattern," IEEE Photonics Technology Letters, Vol. 1, No. 8, pp. 238–240, August 1989, C. Dragone, "Optimum Design of a Planar Array of Tapered Waveguides," Journal of the Optical Society of America, Vol. 7, No. 11, pp. 2081–2093, November 1990, U.S. Pat. 5,039,993 issued Aug. 13, 1991 to C. Dragone, and C. Dragone, "Optimal Finite-Aperture Filters with Maximum Efficiency," Journal of the Optical Society of America, Vol. 9, No. 11, pp. 2048–2054, November 1992, all of which are incorporated by reference herein, involves tapering the width of the waveguide arms using a gradual adiabatic taper, such that the waveguides arms are widest near the free space region 12. In a gradual adiabatic taper, most of the electric field remains in the fundamental or dominant eigenmode of a given waveguide arm, and very little power is transferred to other modes. This reduces the transition losses between the waveguide arms and the free space region, such that more optical signal light reaches the first Brillouin zone.

Another technique for improving the efficiency of the conventional star coupler 10 is described in C. van Dam et al., "Loss Reduction for Phased-Array Demultiplexers Using a Double Etch Technique," Integrated Photonics Research, Boston, Mass., pp. 52–55, Apr. 29–May 2, 1996, which is incorporated by reference herein. This technique involves adding a second high-index layer over the waveguide arms of the coupler, such that a vertical taper is produced. Like the above-described gradual adiabatic taper, this vertical taper approach reduces the transition losses between the waveguide arms and the free space region, such that more optical signal light reaches the first Brillouin zone. The vertical taper acts as a gradual adiabatic taper in the sense that the fields in the waveguide arms remain substantially in the fundamental eigenmode. Although the vertical taper is based on the same principles as the above-described gradual taper, vertical tapers are generally difficult to fabricate and therefore utilize an abrupt transition instead of a gradual transition. Nonetheless, star couplers using either the gradual taper or vertical taper approaches typically exhibit a multi-channel output radiation pattern which is peaked in its center, and therefore may not provide the optimal radiation pattern required in a given application.

It is therefore apparent that a need exists for improved techniques for shaping the output radiation pattern of a star coupler, without undermining the efficiency of the coupler, such that the radiation pattern can be optimized for a given signal routing application.

SUMMARY OF THE INVENTION

The present invention provides a star coupler or other type of signal router in which excitation and coupling of multiple modes of input or output waveguide arms are utilized to distribute radiation from a waveguide arm in an efficient and uniform manner. An exemplary signal router in accordance with the invention includes a free space region having an input side and an output side, with sets of input and output waveguide arms extending from the respective input and output sides. A given one of the input or output waveguide arms is configured such that a signal applied thereto excites multiple modes of the given waveguide arm. Unlike conventional routers which generally avoid excitation of multiple waveguide modes, the present invention utilizes coupling between the multiple modes to provide a desired multi-channel output radiation pattern for the router. Any one or more of the input or output waveguide arms may be configured to include excitation and coupling of multiple waveguide modes in accordance with the invention. When a signal is applied to a waveguide arm configured to support excitation and coupling of multiple modes, it is radiated from the arm into the free space region in accordance with the radiation pattern. The shape of the multi-channel output radiation pattern for a given router may be selected by altering characteristics of one or more of the waveguide arms.

In an illustrative embodiment of the invention, a transition is provided for a given waveguide arm by configuring the waveguide arm to include a first portion and a second portion. The second portion is arranged between the first portion and a side of the free space region, and may be wider or narrower than the second portion, such that a transition in width exists at an interface between the first and second portions. A signal applied to the first portion of the waveguide arm then excites multiple modes of the second portion. Each of the multiple modes of the second portion has a different propagation constant, such that the above-noted coupling of two or more modes is provided on the waveguide arm. In another illustrative embodiment, the transition is provided for a given waveguide arm by including at least one auxiliary waveguide arm between first and second adjacent waveguide arms of the signal router. A gap between the auxiliary waveguide arm and at least one of the first and second waveguide arms may be maintained at a substantially constant width along a portion of a length of the auxiliary waveguide arm. In other embodiments, a given auxiliary waveguide arm may be abrupt, tapered or segmented, and two or more auxiliary waveguide arms having different characteristics may be used between adjacent main waveguide arms. Variations in the characteristics of the waveguide arms, such as the length, width and shape of the first and second portions of a two-portion waveguide arm or the length, width and shape of an auxiliary waveguide arm, are used to provide a desired multi-channel output radiation pattern for the corresponding router.

The present invention thus utilizes the excitation and coupling of multiple waveguide modes to shape a multi-channel output radiation pattern of a star coupler or other signal router. A given signal router may include transitions or auxiliary waveguides with one or more of the input waveguide arms, one or more of the output waveguide arms, or one or more of both the input and output waveguide arms. Also, one type of transition or auxiliary waveguide could be utilized for the input waveguide arms, while another type of transition is utilized for the output waveguide arms. As noted above, the radiation pattern shaping techniques of the invention are applicable to a variety of different frequency ranges, including both optical and microwave frequencies. The techniques can be used to provide any of a number of different radiation pattern shapes. Star couplers or other signal routers configured in accordance with the invention are well-suited for use in important signal routing applications such as wavelength multiplexers and demultiplexers, multi-wavelength laser arrays, and microwave phased array antennas. The signal routers configured in accordance with the present invention not only exhibit an efficiency comparable to or greater than that of conventional routers, but also provide a radiation pattern which need not have the peaked shape typically associated with conventional routers. The abruptness of the waveguide arm transitions in certain embodiments also allows the signal router to be constructed with a more compact area than a router with conventional gradual transitions. These and other features and advantages of the present invention will become more apparent from the accompanying drawings and the following detailed description.

DETAILED DESCRIPTION OF THE INVENTION

The present invention will be illustrated below in conjunction with exemplary optical star couplers. It should be understood, however, that the invention is not limited to use with any particular type of signal router, but is instead more generally applicable to any router in which it is desirable to shape a multi-channel output radiation pattern without adversely impacting the router efficiency. Moreover, the radiation pattern shaping techniques described herein can be applied to couplers and other signal routers in non-optical applications, such as microwave signal routing in a phased array antenna. The term "router" as used herein is therefore intended to include star couplers, multiplexers, demultiplexers, switches, and splitters, as well as other signal routing devices operating in optical, microwave or other frequency ranges. The term "field" is intended to include any type of electromagnetic excitation or radiation, including microwave, radio frequency, acoustic, X-ray, and infrared, visible, ultraviolet or other optical radiation. A "waveguide" is generally any conduit or pathway for a field. The term "eigenmode" refers to a mode of a waveguide. The term "mode" as used herein is intended to include eigenmodes. The properties of a given waveguide, such as index of refraction and geometry (e.g., width, height, shape, etc.) affect the number and shape of the eigenmodes of that waveguide. An eigenvalue is generally associated with each eigenmode. The eigenvalues are related to propagation constant, which determines how fast fields travel along the waveguide. Eigenmodes may be guided modes, which can propagate along the waveguide without significant loss, or radiation modes, which decay exponentially along the waveguide. Radiation modes are sometimes referred to as being "cut off." In a given waveguide, fields can be composed of one, two or many eigenmodes. An "abrupt transition" refers to a sudden change in a characteristic of a waveguide, such as a sudden change in width or height. An abrupt transition generally gives rise to a change in the number and type of eigenmodes, and thus a change in the proportions of each eigenmode in a given field. Other types of non-abrupt transitions may also be used to provide superposition or coupling of multiple waveguide modes in accordance with the invention. A "multi-channel radiation pattern" refers generally to the variation as a function of frequency between different output channels of a router, in contrast to the frequency response within any particular channel.

The present invention provides a shaped multi-channel output radiation pattern in a star coupler by altering the structure of the waveguide arms of the coupler. As described in detail above, conventional star couplers generally utilize a gradual, adiabatically tapered transition in the waveguide structure, such that the fields in the waveguide arms are substantially limited to the fundamental eigenmodes of the waveguide arms. The conventional tapered transition thus produces a multi-channel output radiation pattern which is peaked in its center, and which generally cannot be shaped to provide an optimal radiation pattern for a given application. In contrast to the conventional single-mode transitions, the present invention utilizes transitions which excite multiple modes of the waveguide structure. It will be shown below that various characteristics of the waveguide arms can be altered to shape the multi-channel output radiation pattern of the coupler, without adversely impacting the coupler efficiency. The radiation pattern can thereby be made more appropriate for the requirements of a given signal routing application. The coupling of multiple waveguide modes also provides other advantages, such as reducing the overall size of the star coupler. In some configurations, the waveguide arm structures can in fact increase the efficiency of the coupler while also providing the shaped radiation pattern.

Figure 2A:
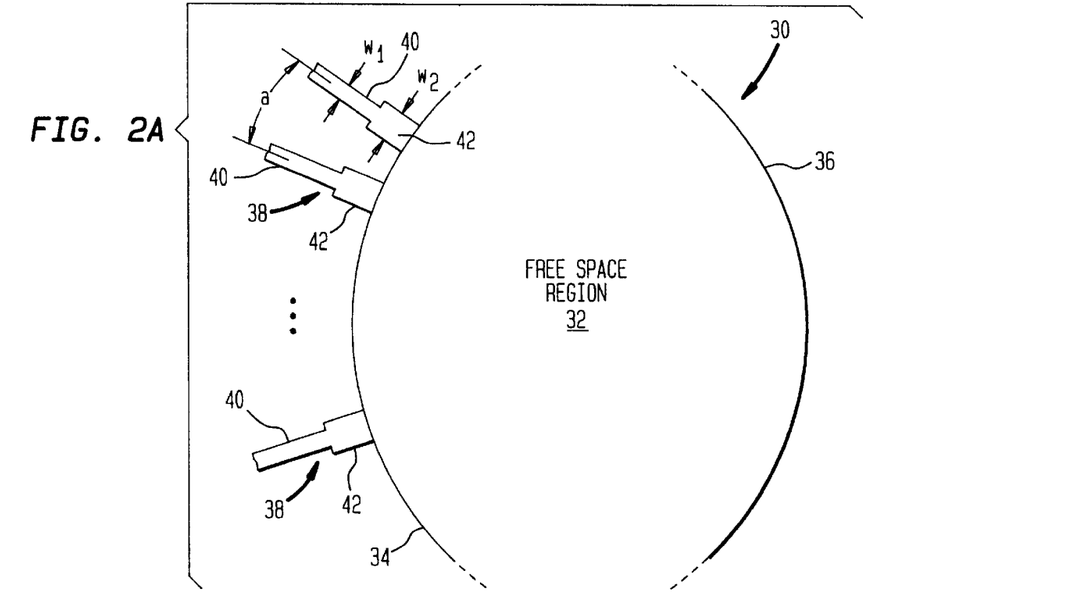
FIG. 2A shows a portion of a star coupler configured with abrupt transitions in one or more waveguide arms in accordance with an illustrative embodiment of the present invention.

FIG. 2A shows a portion of a star coupler 30 configured in accordance with a first illustrative embodiment of the present invention. The coupler 30 includes a free space region 32 defined by left and right circular arcs 34 and 36. A number of input waveguide arms 38 are arranged in an array along the left arc 34 as shown. The coupler 30 may be constructed using any suitable type of material, including semiconductor materials such as silicon, InP, and GaAs, as well as other materials such as oxides, polymers and fibers. The output waveguides are omitted for clarity of illustration, but may be configured in a conventional manner as in FIG. 1 or with any of the different types of transitions to be described below. Pairs of adjacent input waveguides 38 are separated by a distance a which represents the period of the star coupler 30. Each of the input waveguides 38 includes an abrupt transition between a narrow waveguide portion 40 having width $w_1$ and a wider waveguide portion 42 having width $w_2$. A given waveguide arm 38 is thus widest at the arc 42, as in the conventional tapered waveguide arms previously described. In accordance with the invention, the transition at the interface between the narrow portion 40 and the wide portion 42 of the waveguide arm 38 is an abrupt transition, capable of exciting multiple eigenmodes of the waveguide arm. This waveguide structure is also known as a multimode interferometer (MMI). Although the MMI structure itself is known in other contexts, it is believed that the structure has not heretofore been applied to exciting multiple modes of a waveguide arm in order to provide a shaped multi-channel output radiation pattern.

Details regarding conventional MMI devices may be found in, for example, L. B. Soldano and E. C. M. Pennings, "Optical Multi-Mode Interference Devices Based on Self-Imaging: Principles and Applications," IEEE Journal of Lightwave Technology, Vol. 13, No. 4, pp. 615–627, April 1995, which is incorporated by reference herein. Conventional MMI devices may be used to split powers from M input waveguides into N output waveguides, where M and N are both greater than one. In the simplest version, M=1 and N=2, and the power in one input waveguide is divided equally between two output waveguides. More complex MMIs which do not split power equally are described in, for example, P. A. Besse et al., "New 2×2 and 1×3 Multimode Interference couplers with Free Selection of Power Splitting Ratios," IEEE Journal of Lightwave Technology, Vol. 14, No. 10, pp. 2286–2293, October 1996, which is incorporated by reference herein. As will be described in greater detail in conjunction with FIGS. 7A and 7B below, MMIs have also been utilized in a waveguide grating router to shape the frequency response within an individual output port. Such an arrangement is described in J. B. D. Soole et al., "Use of Multimode Interference Couplers to Broaden the Passband of Wavelength-Dispersive Integrated WDM Filters," IEEE Photonics Technology Letters, Vol. 8, No. 10, pp. 1340–1342, October 1996, which is incorporated by reference herein. However, MMIs have not been utilized to shape the frequency variation between different ports of a signal router, as in the present invention.

In accordance with the invention, the signal fields in the narrow waveguide portion 40 of a given waveguide arm 38 excite various modes of the wider portion 42. The various modes of the wider portion 42 have different propagation constants and therefore beat against each other. The superposition of these modes, each with a different phase, yields a large number of possible output radiation patterns. For example, the field $f^L(x,y,z)$ in portion 40 of waveguide arm 38 may be given by:

$$f^L(x,y,z) = \sum_{m=1}^{\max m} c_m^L E_m^L(x,y) \, e^{-jk_m^L(z-z_0)}$$

if the cross-section of portion 40 is constant and therefore independent of z, where $E_m^L(x, y)$ is the mth eigenmode in portion 40, and $c_m^L$ denotes the amount of field in the mth eigenmode, and max m is the maximum number of eigenmodes in portion 40. Similarly, the field $f^R(x,y,z)$ in portion 42 of waveguide arm 38 may be given by:

$$f^R(x, y, z) = \sum_{m=1}^{\max m} c_m^R E_m^R(x, y) e^{-jk_m^R(z-z_0)}$$

if the cross-section of portion 42 is constant and independent of z, where $E_m^R(x,y)$ is the mth eigenmode in portion 40, and $C_m^R$ denotes the amount of field in the mth eigenmode, and max m is the maximum number of eigenmodes in portion 42. It should be noted that constant cross-sections are assumed in portions 40 and 42 for simplicity of illustration only, and that other embodiments may utilize non-uniform cross-sections. In this simplified example, at $z=z_0$ the waveguide portions 40 and 42 meet and $f^L(x,y,z_0)=f^R(x,y,z_0)$.

This equality implies that power transfer between eigenmodes occurs, that is, $c_m^L \neq c_m^R$, because $E_m^L \neq E_m^R$.

A particular multi-channel output radiation pattern appropriate for a given application can therefore be selected by a suitable adjustment of the width and/or length of the narrow portions 40 and the wider portions 42 of the waveguide arms 38. Other variations in the shape of the waveguide arms could also be used to provide an abrupt transition such that the fields in the waveguide arms are composed of a superposition of a plurality of eigenmodes, rather than a single eigenmode as in the conventional tapered transition approach. For example, instead of a single abrupt transition as in the illustrative embodiment of FIG. 2A, a stepped configuration including a series of transitions could be used for one or more of the waveguide arms. Another alternative to the embodiment of FIG. 2A is an embodiment in which the width $w_1$ of the first portion 40 is wider than the width $w_2$ of the second portion 42. Such an embodiment may involve excitation of radiation modes as well as guided modes of the waveguide arm.

Figure 2B:
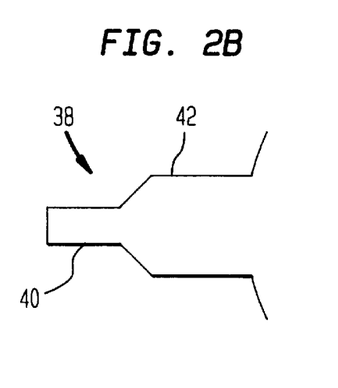
FIGS. 2B through 2H show alternative waveguide arm transitions which may be used to provide coupling of multiple waveguide eigenmodes in accordance with the invention.
Figure 2C:
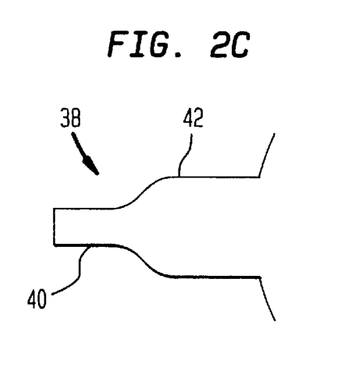
Figure 2D:
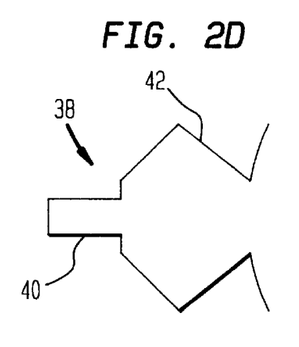
Figure 2E:
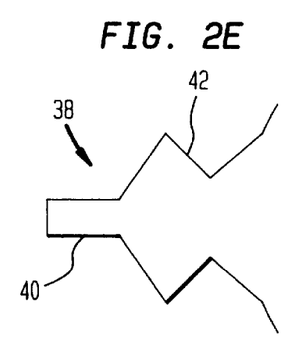
Figure 2F:
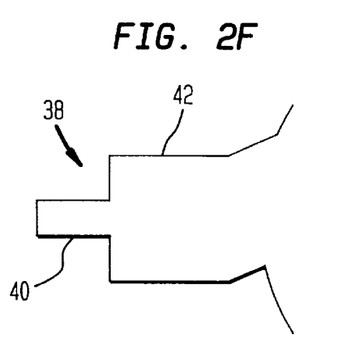
Figure 2G:
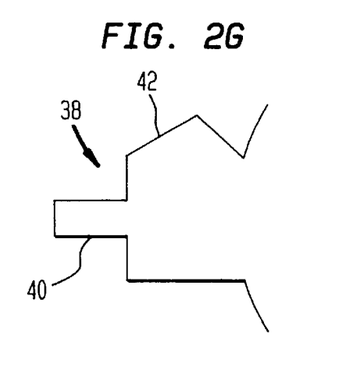
Figure 2H:
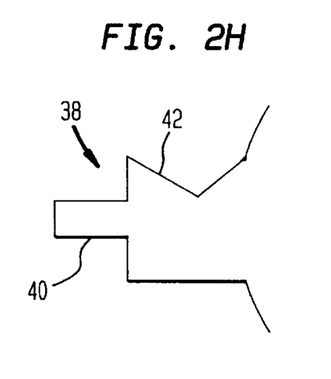

FIGS. 2B through 2H show a number of other alternative waveguide transitions suitable for use in exciting multiple modes of a waveguide arm in the star coupler of FIG. 2A. Each of FIGS. 2B through 2H shows a waveguide arm 38 including a first portion 40 and a second portion 42, as in the FIG. 2A embodiment. FIGS. 2B and 2C show waveguide arm transitions which are more gradual than the abrupt transition of FIG. 2A embodiment, but significantly less gradual than the typical prior art gradual adiabatic transitions described above. In the prior art transitions, the waveguide transition is very gradual, such that excitation of multiple waveguide modes is minimized. The present invention, in contrast, encourages excitation of multiple waveguide modes, in order to shape the output radiation pattern. The transitions of FIGS. 2B and 2C illustrate that excitation of multiple waveguide modes can be provided using transitions which are less abrupt than the FIG. 2A transition, but less gradual than the prior art adiabatic transitions. The transitions shown in FIGS. 2D through 2H are referred to generally as "butterfly" MMI structures. These and other MMI structures are described in greater detail in the above-cited P. A. Besse et al. reference. As noted above, although these and other MMI structures are known and used in other contexts, it is believed that such structures have not been used to provide excitation of multiple waveguide modes for purposes of shaping a multi-channel output radiation pattern.

Numerous other transitions could also be used to excite multiple modes of a given waveguide arm in order to provide multi-channel output radiation pattern shaping in accordance with the invention. For example, the regular MMI structure of FIG. 2A may be viewed as a specific example of the more general "butterfly" MMI, which in turn is a specific example of a waveguide having a cross-section which changes significantly over a short distance such that power is transferred between different eigenmodes. The waveguide structures shown in FIGS. 2B through 2H, like that of FIG. 2A, may also be configured such that the width $w_1$ of the first portion 40 is wider than the width $w_2$ of the second portion 42. For example, the positions of portions 40 and 42 in FIGS. 2B through 2H may be interchanged. As previously noted in conjunction with FIG. 2A above, such embodiments may involve excitation of radiation modes as well as guided modes of the waveguide arm.

Figure 3A:
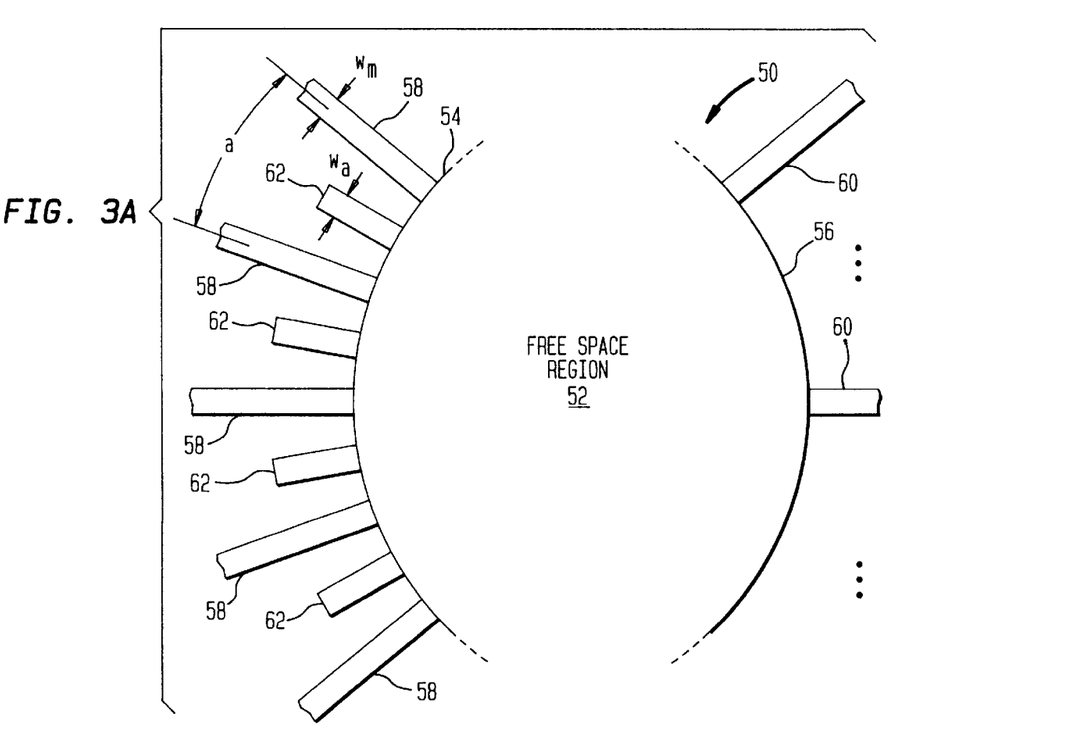
FIG. 3A shows a portion of a star coupler configured with a waveguide arm transition in the form of an auxiliary waveguide arranged between a pair of adjacent waveguide arms in accordance with another embodiment of the present invention.

FIG. 3A shows a portion of a star coupler 50 configured in accordance with a second illustrative embodiment of the invention. The coupler 50 includes a free space region 52 defined by left and right circular arcs 54 and 56. A number of input waveguide arms 58 are arranged in an array along the left arc 54. Each of the waveguide arms has a width $w_m$. The coupler 50 includes a number of output waveguide arms 60, one or more of which may also be configured to utilize a transition which excites multiple waveguide modes. The period a of the coupler 50 corresponds to the distance between center lines of an adjacent pair of waveguide arms 58. In a conventional star coupler, such as that shown in FIG. 1, the array of input waveguide arms includes only a single waveguide repeated periodically with period a. A gradual adiabatic transition is provided in the conventional coupler by, for example, configuring the waveguide arms with a gradual taper in width, such that the fields in the waveguide arms excite only fundamental eigenmodes. The coupler 50 of the present invention in contrast provides a waveguide arm transition such that the fields in the waveguide arms are composed of a superposition of a plurality of eigenmodes. This transition is provided by including an auxiliary waveguide arm 62 between each pair of main waveguide arms 58. The auxiliary waveguide arms 62 in this embodiment do not serve as input waveguides for supplying signal inputs to the coupler 50, but are instead configured to provide the above-noted transition which alters the characteristics of the fields on the main waveguide arms.

Fields in a particular main waveguide arm 58 are generally localized or confined in that waveguide arm, while a small portion of the field exists outside the waveguide arm. The magnitude of the portion of the field outside the waveguide arm 58 generally depends on the shape of the eigenmodes of the waveguide arm. When a second or auxiliary waveguide arm 62 is located near the main waveguide arm 58 as shown in FIG. 3A, some light from the main waveguide arm may be present in an eigenmode of the auxiliary waveguide arm. This spatial overlap of the eigenmodes of the two waveguide arms leads to power transfer or coupling between the eigenmodes. The total amount of power transferred depends on the shape of the eigenmodes, the separation between the waveguide arms, and the distance over which the two waveguide arms interact. In the example of FIG. 3A, each auxiliary waveguide arm 62 has a width $w_a$, and is arranged at approximately the midpoint between a pair of main waveguide arms 58. Each period a of the coupler 50 thus includes two waveguides, rather than a single waveguide in a conventional structure. Alternative embodiments could include two or more auxiliary waveguide arms between each pair of adjacent main waveguide arms. In general, different auxiliary guides may have different shapes, separations and dimensions. The use of one auxiliary waveguide between main waveguide arms typically produces two peaks in the resulting multi-channel output radiation pattern, while use of two or more auxiliary waveguide arms between main waveguide arms may produce three or more peaks.

Figure 3B:
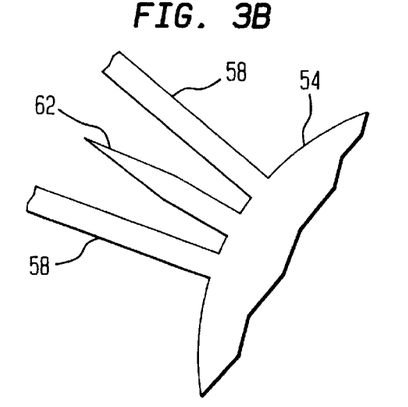
FIGS. 3B through 3D show alternative auxiliary waveguide arrangements which may be utilized to provide coupling of multiple eigenmodes in accordance with the invention.
Figure 3C:
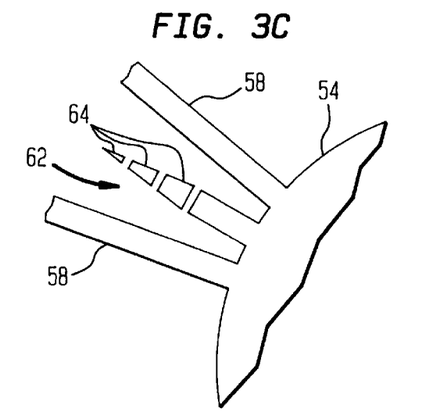
Figure 3D:
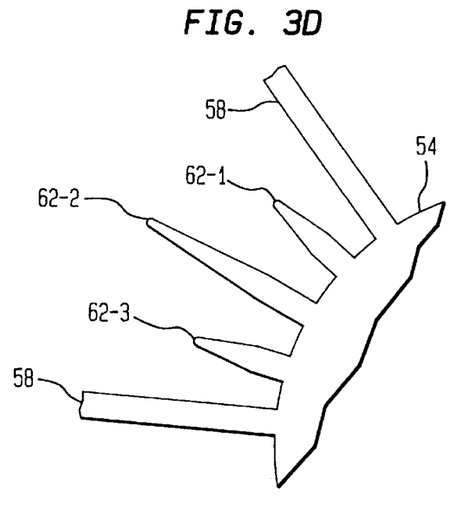

FIGS. 3B through 3D show a number of alternative auxiliary waveguide arrangements suitable for use in exciting multiple modes of a waveguide arm in the star coupler 50 of FIG. 3A. In the FIG. 3B arrangement, the auxiliary waveguide arm 62 includes a gradual taper rather than the abrupt termination shown in FIG. 3A. FIG. 3C shows an embodiment in which the auxiliary waveguide arm 62 is segmented into a number of distinct elements 64. FIG. 3C shows an example of the above-noted alternative embodiment in which three auxiliary waveguide arms 62-1, 62-2 and 62-3 are arranged between a pair of main waveguide arms 58. Each of these arrangements results in the excitation of multiple waveguide modes on a given waveguide arm 58, and is therefore suitable for use in providing radiation pattern shaping in accordance with the invention.

Figure 4:
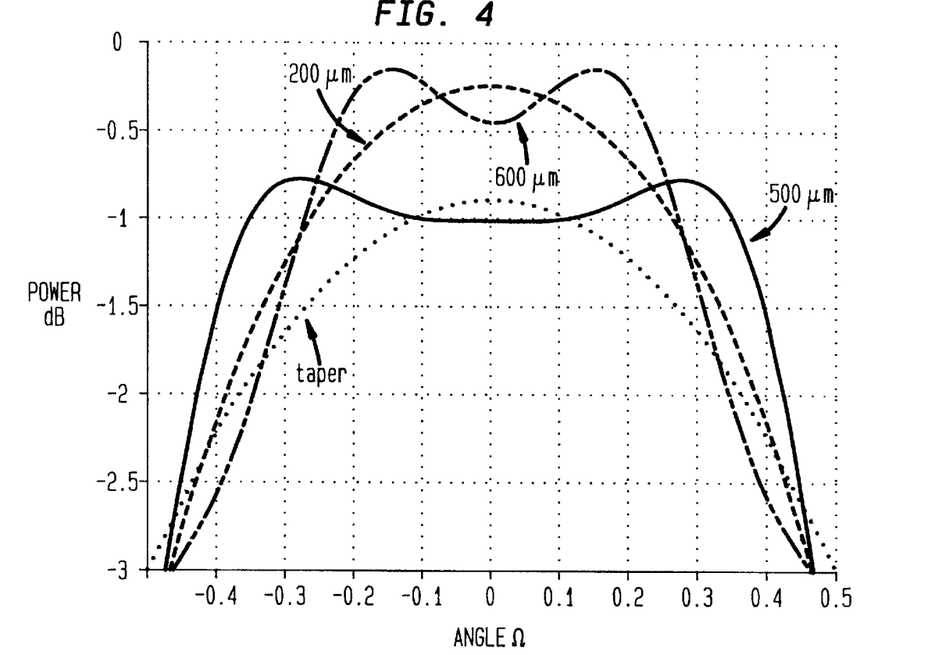
FIGS. 4 and 5 plot multi-channel output radiation patterns of star coupler waveguide arms configured with abrupt transitions in accordance with the invention, as a function of Brillouin zone angle and waveguide arm dimensions.

FIG. 4 shows a set of plots illustrating the multi-channel output radiation patterns generated by star couplers configured using the waveguide arm transitions described in conjunction with FIG. 2A. The radiation patterns are plotted as power radiated to the right arc 36 in decibels (dB) as a function of the previously-described normalized Brillouin zone angle $\Omega$, with an input optical signal applied to one of the waveguide arms 38. As noted above, values of $\Omega$ between −0.5 and 0.5 define a first Brillouin zone. The coupler efficiency is related to the degree to which the coupler is able to confine the radiated power to the first Brillouin zone. The abrupt transition used in the example of FIG. 4 had a narrow portion width $w_1$ of 5 μm, and a wider portion width $w_2$ of 15 μm. The index n of the waveguide arms 38 and the free space region 32 were about 0.40% higher than that of the surrounding material, which had an index n of 1.4457. The wavelength of the input optical signal applied to a given one of the input waveguide arms 38 was about 1.55 μm. FIG. 4 shows the multi-channel output radiation patterns provided by three different-length MMI structures, as well as a radiation pattern provided by using a conventional gradual taper approach. The radiation pattern labeled "taper" is generated by a star coupler which includes only conventional gradual, adiabatically-tapered transitions on the waveguide arms. It can be seen that the conventional "taper" radiation pattern is peaked in its center, as previously described. The three patterns labeled "200 μm", "500 μm" and "600 μm" correspond to three different implementations of the abrupt transition structure of FIG. 2A, and the label indicates the length of the wider portion 42 of a given waveguide arm 38 as measured from the left arc 34 to the narrow portion 40.

The pattern corresponding to a 200 μm long portion 42 was generated for a coupler with a period a of 19.2 μm, as measured near the free space region 32, and a radius of curvature R of 4800 μm. It can be seen that the multi-channel output radiation pattern in this case is peaked like the conventional taper radiation pattern, but provides a higher output power for a given input and thus has a significantly higher efficiency than the conventional taper pattern. The pattern corresponding to a 500 μm long portion 42 was generated for a coupler with a period a of 18 μm and a radius of curvature R of 4500 μm. The resulting radiation pattern is substantially flatter than the conventional taper pattern, and has a transition loss of less than 1.05 dB for $|\Omega|<0.35$. The pattern corresponding to a 600 μm long portion 42 was generated for a coupler with a period a of 17.6 μm and a radius of curvature R of 4400 μm. The resulting radiation pattern is more efficient but less flat than the 500 μm radiation pattern, and has a transition loss of less than about 0.3 dB for $|\Omega|<0.20$. The radiation patterns of FIG. 4 indicate that the abrupt transition waveguide arm structure of FIG. 2A can be used to provide a variety of different radiation pattern shapes, all having efficiency greater than or comparable to that provided by the conventional gradual taper approach. It should be noted that radiation pattern shapes other than those shown can be provided as required for a given application, and that non-abrupt transitions such as those described in conjunction with FIGS. 2B through 2H could be used to provide similar results.

Figure 5:
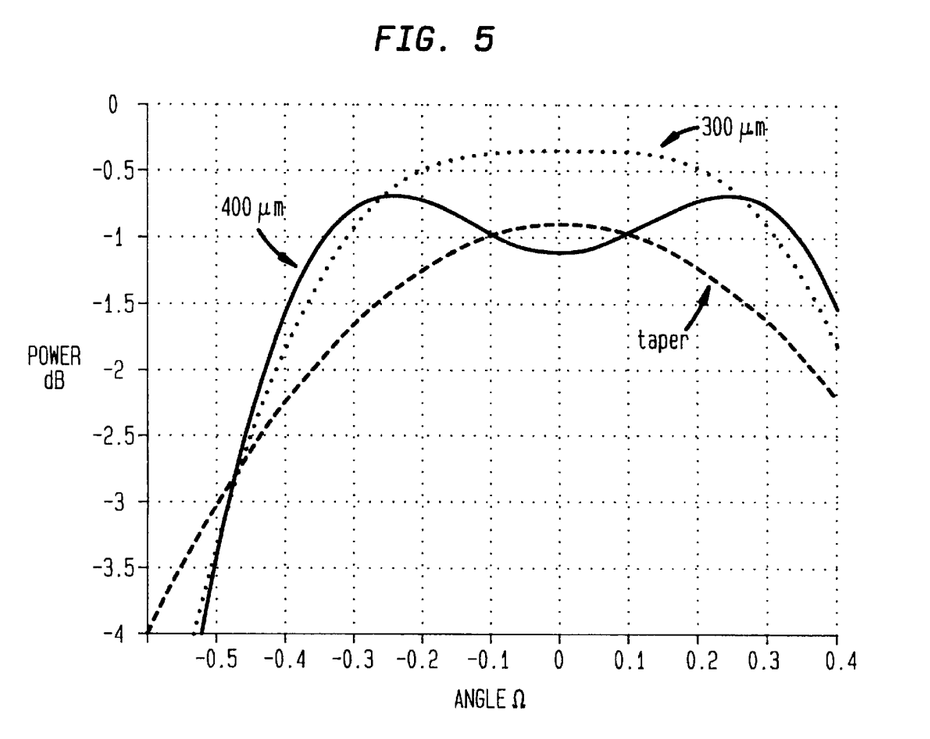

FIG. 5 shows a set of plots illustrating the multi-channel output radiation patterns generated by star couplers configured using the waveguide arm arrangements described in conjunction with FIG. 3A. The radiation patterns are plotted as power radiated to the right arc 56 in dB as a function of the Brillouin zone angle $\Omega$, with an input optical signal applied to one of the main waveguide arms 58. A single auxiliary waveguide arm 62 was added between each pair of adjacent main waveguide arms 58. In the examples of FIG. 5, the period a was about 14 μm as measured near the free space region 52, and the radius of curvature R was about 2000 μm. The width $w_m$ of the main waveguide arm 58 was about 5 μm, and the width $w_a$ of the auxiliary waveguide arm 62 was about 3 μm, both as measured near the free space region 52. The width $w_a$ of the auxiliary guide 62 changes along its length such that gap between it and each of its adjacent main waveguide arms is maintained at a constant 3 μm. As previously noted in conjunction with FIG. 3A, the auxiliary guide 62 provides an abrupt transition which alters the field on the main waveguide arm such that it contains a superposition of a plurality of eigenmodes. As in the examples of FIG. 4, the index n of the waveguide arms 58, 62 and the free space region 52 were about 0.40% higher than that of the surrounding material, which had an index n of 1.4457, and the applied input optical signal wavelength was about 1.55 μm.

The peaked radiation pattern labeled "taper" in FIG. 5 is generated by a star coupler which includes only conventional gradual, adiabatically-tapered transitions on the waveguide arms, and no auxiliary waveguide arms. The two patterns labeled "300 μm" and "400 μm" correspond to two different implementations of the abrupt transition structure of FIG. 3A, and the label indicates the length of the auxiliary waveguide 62. The pattern corresponding to a 300 μm long auxiliary waveguide arm 62 is peaked like the conventional taper radiation pattern, but provides a higher output power for a given input and thus has a significantly higher efficiency than the conventional taper pattern. The pattern corresponding to a 400 μm long auxiliary waveguide arm 62 is substantially flatter than the conventional taper pattern, and has a transition loss of about 1 dB for $|\Omega|<0.35$. The radiation patterns of FIG. 5 indicate that the abrupt transition provided by the auxiliary waveguide arms of FIG. 3A can be used to provide a variety of different radiation pattern shapes, all having efficiency greater than or comparable to that provided by the conventional gradual taper approach. Again, radiation patterns other than those shown could also be provided using the techniques of the present invention, and alternative auxiliary waveguide arrangements such as those described in conjunction with FIGS. 3B through 3D could be used to provide similar results.

Figure 6A:
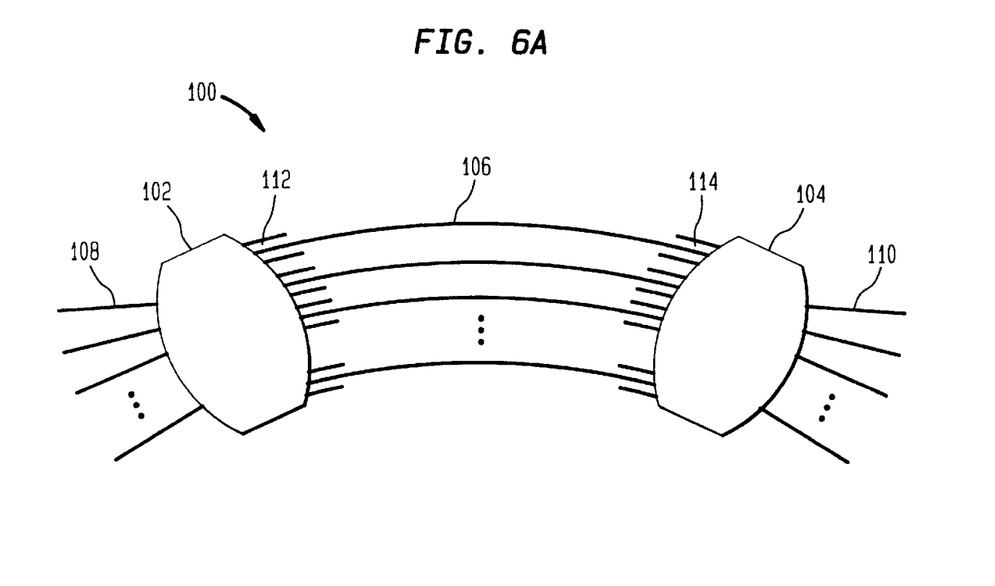
FIGS. 6A and 6B show exemplary optical routers configured using a pair of star couplers with shaped radiation patterns in accordance with the invention.

FIG. 6A illustrates an N×N optical waveguide grating router (WGR) 100 which may be configured to utilize the radiation pattern shaping techniques of the present invention. The router 100 is a modified version of the type of router described generally in U.S. Pat. Nos. 5,136,671, 5,412,744, 5,467,418 and 5,488,680, all of which are incorporated by reference herein. The router 100 includes a first coupler 102, a second coupler 104 and N grating arms 106 interconnecting the first and second coupler. The first coupler 102 includes N input waveguide arms 108, and the second coupler 104 includes N output waveguide arms 110. Output waveguide arms of the first coupler 102 are connected via the grating arms 106 to corresponding inputs of the second coupler 104. In accordance with the invention, the router 100 also includes a number of auxiliary waveguide arms 112 arranged between output waveguide arms of the first coupler 102, and a number of auxiliary waveguide arms 114 arranged between input waveguide arms of the second coupler 104. One or more auxiliary waveguide arms 112 are associated with each of the output waveguide arms of the first coupler 102, and one or more auxiliary waveguide arms 114 are associated with each of the input waveguide arms of the second coupler 104.

The auxiliary waveguide arms 112 and 114 may be configured in the manner described in conjunction with FIGS. 3A through 3D above. Alternative embodiments could include tapered auxiliary waveguides, segmented auxiliary waveguides, or multiple auxiliary waveguides between each pair of main waveguide arms. It should be noted that the auxiliary waveguide arms 112 need not be of the same type or in the same configuration as the auxiliary waveguide arms 114. Moreover, one or more of the auxiliary waveguide arms may be replaced with an MMI structure on the corresponding main waveguide arm, such that the router 100 uses a combination of auxiliary waveguide arms and MMI structures.

Figure 6B:
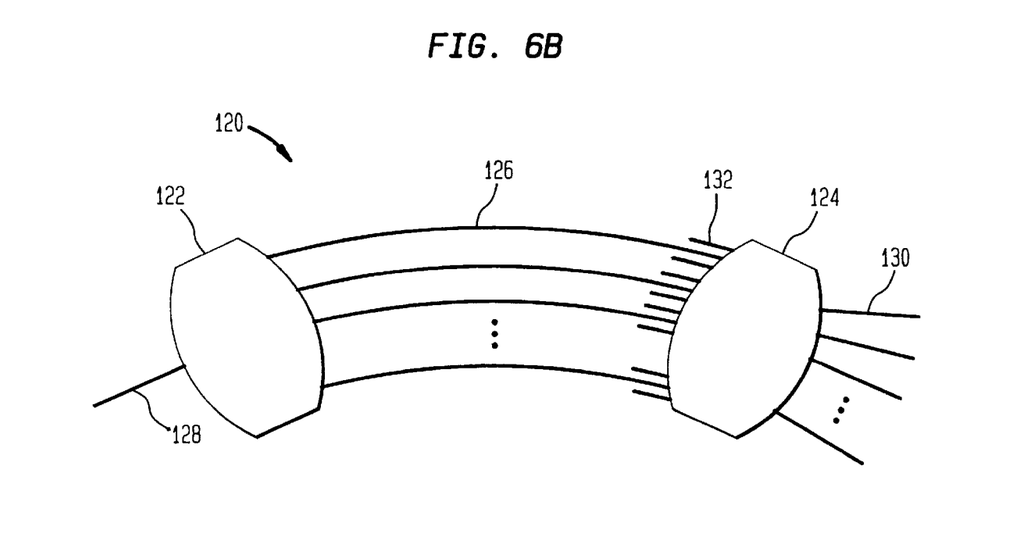

FIG. 6B shows a 1×N optical WGR 120 configured to utilize the radiation pattern shaping techniques of the present invention. The router 120 includes a first coupler 122, a second coupler 124 and N grating arms 126 interconnecting the first and second couplers. The first coupler 122 includes a single input waveguide arm 128, and the second coupler 124 includes N output waveguide arms 130. Output waveguide arms of the first coupler 122 are connected via the grating arms 126 to corresponding inputs of the second coupler 124. In accordance with the invention, the router 120 also includes a number of auxiliary waveguide arms 132 arranged adjacent to input waveguide arms of the second coupler 124. One or more auxiliary waveguide arms 132 are associated with each of the input waveguide arms of the second coupler 124. As in the FIG. 6A embodiment, the auxiliary waveguide arms 132 may be configured utilizing any of the embodiments described in conjunction with FIGS. 3A through 3D above. Also, one or more of the auxiliary waveguide arms 132 may be replaced with an MMI structure on the corresponding main waveguide arm, such that the router 120 uses a combination of auxiliary waveguide arms and MMI structures.

The optical routers 100 and 120 can be used to provide a variety of multiplexing, demultiplexing and switching operations. For example, the router 100 may be used to multiplex a number of wavelength channels applied to different input waveguide arms of the first star coupler 102 such that a single multi-channel optical signal appears at a particular one of the output waveguide arms of the second coupler 104. The routers 100 and 120 may be used to demultiplex a multi-channel optical signal applied to an input waveguide arm of the first coupler into its distinct wavelength channels, such that each wavelength channel appears at a particular one of the output waveguide arms of the second coupler. An appropriate selection of input signal wavelength also permits the router 100 to switch an input signal between any selected input waveguide arm of the first coupler and any selected output waveguide arm of the second coupler. Additional details regarding the operation of wavelength grating routers may be found in the above-cited U.S. Patents. The signal routers of the present invention may be utilized in numerous other optical and non-optical signal routing applications.

Figure 7A:
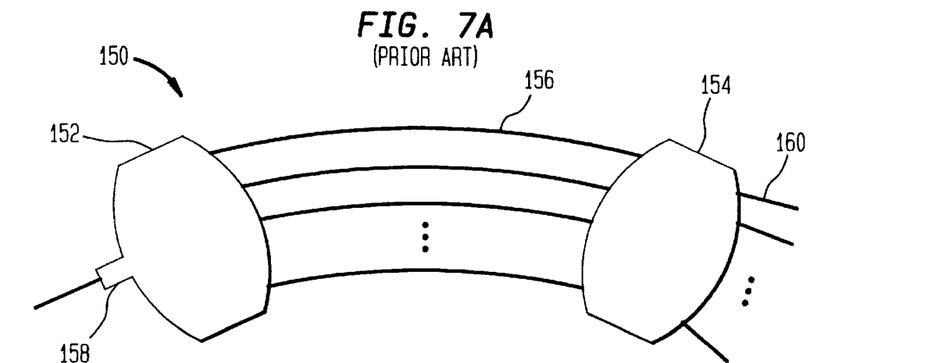
FIGS. 7A and 7B illustrate the conventional use of a multi-mode interferometer in a waveguide grating router in accordance with the prior art.
Figure 7B:
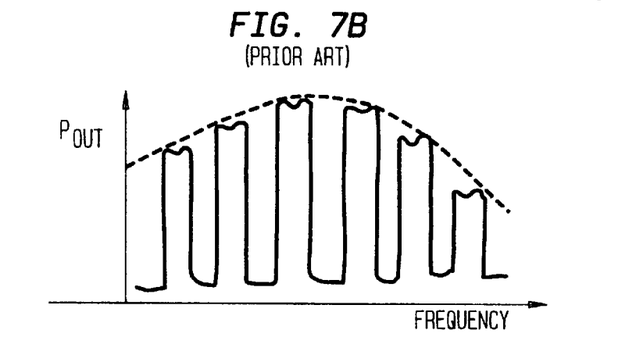

FIGS. 7A and 7B illustrate the operation of a conventional 1×N wavelength grating router 150 which utilizes an MMI structure. As noted above, MMI structures have been utilized to shape the frequency response of a particular router output channel. The FIG. 7A router is of the type described in the previously-cited J. B. D. Soole et al. reference. The conventional router 150 includes a first star coupler 152 having its output waveguide arms connected via grating arms 156 to corresponding input waveguide arms of a second star coupler 154. The first coupler includes a single input waveguide arm 158 configured as an MMI structure. The second coupler includes N output waveguide arms 160. FIG. 7B shows the output frequency response of the router 150. The MMI structure on the input waveguide arm 158 is used to shape the frequency response of particular output channels as shown. However, the conventional arrangement of FIG. 7A does not shape the radiation pattern of the router in terms of variation between different router output channels as a function of frequency, as in the present invention. The multi-channel output radiation pattern shown in FIG. 7B is thus of the conventional peaked variety previously described.

Figure 8A:
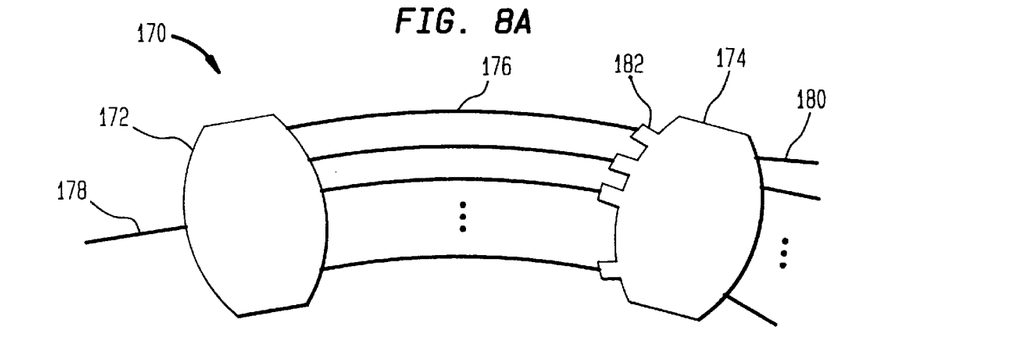
FIGS. 8A and 8B illustrate the use of multi-mode interferometers to provide radiation pattern shaping in a waveguide grating router in accordance with the present invention.
Figure 8B:
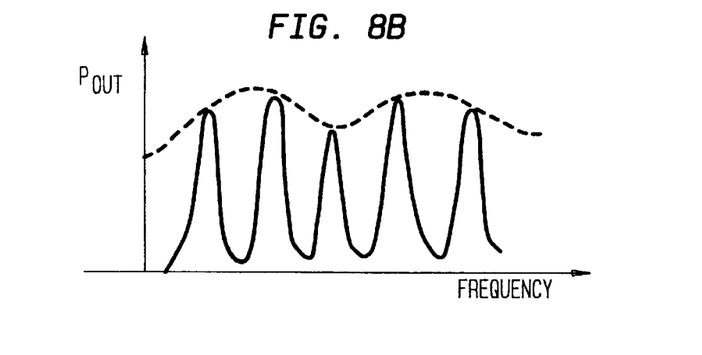

FIGS. 8A and 8B illustrate a 1×N wavelength grating router 170 with multi-channel output radiation pattern shaping in accordance with the present invention. The router 170 includes a first star coupler 172, a second star coupler 174, and N grating arms 176 connecting output waveguide arms of the first coupler 172 to corresponding input grating arms of the second coupler 174. The second star coupler 174 has N output waveguide arms. The input waveguide arms of the second coupler 174 are configured as MMI structures 182 of the type described in conjunction with FIGS. 2A through 2H above. This arrangement permits the output radiation pattern of the router to be shaped across multiple router output channels as a function of frequency. FIG. 8B shows the output frequency response of the router 170. The peaks in the response correspond to different output channels of the router 170. It can be seen that the placement of the MMI structures 182 at the inputs of the second coupler 174 provides shaping of the response across multiple channels. This is in contrast to the prior art use of the MMI structure to provide shaping within a given channel, as illustrated in FIGS. 7A and 7B above. The FIG. 8B response therefore shows a shaped multichannel radiation pattern. Other radiation pattern shapes, such as those described in conjunction with FIGS. 4 and 5 above, may also be provided in the router 170 of FIG. 8A.

The present invention utilizes excitation and coupling of multiple waveguide modes to shape a multi-channel output radiation pattern of a star coupler or other signal router. The multiple waveguide modes may be excited using transitions on the waveguide arms or auxiliary waveguides arranged adjacent to the waveguide arms. A given signal router may include transitions or auxiliary waveguides with one or more of the input waveguide arms, one or more of the output waveguide arms, or one or more of both the input and output waveguide arms. Also, one type of transition or auxiliary waveguide could be utilized for the input waveguide arms, while another type of transition or auxiliary waveguide is utilized for the output waveguide arms. The radiation pattern shaping techniques of the invention are applicable to a variety of different frequency ranges, including both optical and microwave frequencies. The techniques can be used to provide any of a number of different radiation pattern shapes in addition to the flattened and peaked radiation pattern shapes illustrated in conjunction with FIGS. 4 and 5 above. Furthermore, the invention may be utilized in conjunction with conventional techniques, such as gradual adiabatic waveguide arm tapering. Star couplers or other signal routers configured in accordance with the invention are well-suited for use in important signal routing applications such as wavelength multiplexers and demultiplexers, multiwavelength laser arrays, and microwave phased array antennas.

The above-described embodiments of the invention are intended to be illustrative only. Numerous alternative embodiments may be devised by those skilled in the art without departing from the scope of the following claims.

What is claimed is:

1. A signal router comprising:

a free space region; and a plurality of waveguide arms extending from a side of the free space region, wherein at least one of the waveguide arms is configured such that a signal applied to the at least one waveguide arm excites multiple modes of that waveguide arm, and coupling of the multiple modes is used to shape a multi-channel output radiation pattern of the router.

2. The router of claim 1 wherein the at least one waveguide arm is configured to include a first portion and a second portion, with the second portion arranged between the first portion and the free space region, and wherein the first and second portions have different widths.

3. The router of claim 2 wherein a transition between the first portion and the second portion is an abrupt transition.

4. The router of claim 1 wherein the plurality of waveguide arms extending from a side of the free space region include first and second adjacent input waveguide arms, and at least one auxiliary waveguide arm is arranged between the first and second adjacent input waveguide arms.

5. The router of claim 4 wherein a gap between the auxiliary waveguide arm and at least one of the first and second waveguide arms is maintained at a substantially constant width along a portion of a length of the auxiliary waveguide arm.

6. The router of claim 4 wherein the at least one auxiliary waveguide arm is a tapered waveguide arm.

7. The router of claim 4 wherein the at least one auxiliary waveguide arm is a segmented waveguide arm.

8. The router of claim 4 wherein two or more auxiliary waveguide arms are arranged between the first and second adjacent input waveguide arms.

9. The router of claim 1 wherein the signal is an optical signal.

10. The router of claim 1 further including a second plurality of waveguide arms extending from a side of the free space region opposite the side from which the first plurality of waveguide arms extend.

11. A method of shaping a radiation pattern of a signal router including a free space region and a plurality of waveguide arms extending from a side of the free space region, the method comprising the steps of:

configuring at least one of the waveguide arms such that a signal applied to the at least one waveguide arm excites multiple modes of that waveguide arm; and shaping a multi-channel output radiation pattern of the router by providing coupling between the multiple modes.

12. The method of claim 11 wherein the configuring step further includes configuring the at least one waveguide arm to include a first portion and a second portion, such that the second portion is arranged between the first portion and the free space region, and the first and second portions have different widths.

13. The method of claim 12 wherein a transition between the first portion and the second portion is an abrupt transition.

14. The method of claim 11 wherein first and second adjacent input waveguide arms extend from the side of the free space region, and the configuring step includes providing at least one auxiliary waveguide arm between the first and second adjacent waveguide arms.

15. The method of claim 14 further including the step of maintaining a gap between the auxiliary waveguide arm and at least one of the first and second waveguide arms at a substantially constant width along a portion of a length of the auxiliary waveguide arm.

16. The method of claim 14 wherein the at least one auxiliary waveguide arm is a tapered waveguide arm.

17. The method of claim 14 wherein the at least one auxiliary waveguide arm is a segmented waveguide arm.

18. The method of claim 14 wherein two or more auxiliary waveguide arms are arranged between the first and second adjacent input waveguide arms.

19. The method of claim 11 wherein the signal is an optical signal.

20. A signal router having a free space region with an input side and an output side, the router comprising:

first and second adjacent input waveguide arms extending from one of the sides of the free space region; and at least one auxiliary waveguide arm arranged between the first and second adjacent input waveguide arms, the auxiliary waveguide arm providing coupling between multiple modes of at least one of the first and second waveguide arms.

21. The router of claim 20 wherein a gap between the auxiliary waveguide arm and at least one of the first and second waveguide arms is maintained at a substantially constant width along a portion of a length of the auxiliary waveguide arm.

22. The router of claim 20 wherein the at least one auxiliary waveguide arm is a tapered waveguide arm.

23. The router of claim 20 wherein the at least one auxiliary waveguide arm is a segmented waveguide arm.

24. The router of claim 20 wherein two or more auxiliary waveguide arms are arranged between the first and second adjacent input waveguide arms.

25. A signal router comprising:

first and second couplers each having a set of input waveguide arms and a set of output waveguide arms; and a connection between at least one of the output waveguide arms of the first coupler and at least one of the input waveguide arms of the second coupler;

wherein at least one of the output waveguide arms of the first coupler or the input waveguide arms of the second coupler is configured such that a signal applied to the at least one waveguide arm excites multiple modes of that waveguide arm, and coupling of the multiple modes is used to shape a multi-channel output radiation pattern of the router.

* * * * *